(12) United States Patent
Kumar et al.

(10) Patent No.: US 9,077,696 B2
(45) Date of Patent: Jul. 7, 2015

(54) TRANSFERRING DATA ITEMS AMONGST COMPUTING DEVICES USING METADATA THAT IDENTIFIES A LOCATION OF A TRANSFERRED ITEM

(75) Inventors: Arora Puneet Kumar, Delhi (IN); Narasimha Reddy KV, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 13/457,233

(22) Filed: Apr. 26, 2012

(65) Prior Publication Data

US 2013/0288597 A1  Oct. 31, 2013

(51) Int. Cl.
*H04B 5/00* (2006.01)
*H04L 29/08* (2006.01)
*H04W 4/00* (2009.01)
*H04W 4/20* (2009.01)

(52) U.S. Cl.
CPC .............. *H04L 67/06* (2013.01); *H04W 4/008* (2013.01); *H04W 4/206* (2013.01)

(58) Field of Classification Search
CPC ........ H04W 4/008; H04L 67/06; H04L 65/60
USPC ...................................................... 455/41.1
See application file for complete search history.

(56) References Cited

U.S. PATENT DOCUMENTS

| | | | |
|---|---|---|---|
| 6,785,421 | B1 | 8/2004 | Gindele et al. |
| 2002/0126135 | A1* | 9/2002 | Ball et al. ....................... 345/600 |
| 2003/0090504 | A1* | 5/2003 | Brook et al. ................... 345/716 |
| 2007/0033295 | A1* | 2/2007 | Marriott ......................... 709/248 |
| 2007/0038771 | A1* | 2/2007 | Julia et al. ..................... 709/231 |
| 2007/0239981 | A1* | 10/2007 | Lessing ......................... 713/164 |
| 2008/0003944 | A1* | 1/2008 | Ahlgren ....................... 455/41.1 |
| 2008/0092054 | A1* | 4/2008 | Bhumkar et al. ............. 715/739 |
| 2009/0088188 | A1* | 4/2009 | Wormald et al. ............. 455/466 |
| 2009/0201316 | A1 | 8/2009 | Bhatt et al. |
| 2010/0078471 | A1* | 4/2010 | Lin et al. ....................... 235/379 |
| 2010/0134385 | A1 | 6/2010 | Roth et al. |
| 2010/0210312 | A1 | 8/2010 | Kim et al. |
| 2010/0211409 | A1* | 8/2010 | Kotula et al. ..................... 705/3 |
| 2010/0235498 | A1* | 9/2010 | Handa .......................... 709/224 |
| 2010/0263009 | A1* | 10/2010 | Meuninck et al. ............ 725/110 |

(Continued)

FOREIGN PATENT DOCUMENTS

WO    WO2010089458 A1    8/2010

OTHER PUBLICATIONS

Broll, G. et al., "Design and Evaluation of Techniques for Mobile Interaction with Dynamic NFC-displays," Found at URL < http://dl.acm.org/citation.cfm?id=1935701.1935743&coll=DL&dl=GUIDE&CFID=75193032&CFTOKEN=74335401 >, Proceedings of the fifth international conference on Tangible, embedded, and embodied interaction. 2010, pp. 205-212.

(Continued)

*Primary Examiner* — Wesley Kim
*Assistant Examiner* — Devan Sandiford
(74) *Attorney, Agent, or Firm* — Mahamedi Paradice LLP

(57) ABSTRACT

A first data item is transmitted from a source device to a receiving device with metadata that identifies a location where the data item resides on the source device. The receiving device generates a subsequent request for data items that reside at the location specified by the metadata provided with the first data item. The receiving device generates an output that is based on the data items received from the source device.

12 Claims, 4 Drawing Sheets

(56) References Cited

U.S. PATENT DOCUMENTS

| | | | |
|---|---|---|---|
| 2010/0293248 A1* | 11/2010 | Kamay et al. | 709/219 |
| 2011/0109751 A1 | 5/2011 | Chang et al. | |
| 2011/0279854 A1* | 11/2011 | Ido | 358/1.15 |
| 2011/0319016 A1* | 12/2011 | Gormley et al. | 455/41.1 |
| 2012/0124178 A1* | 5/2012 | Sparks | 709/219 |
| 2012/0183229 A1* | 7/2012 | McDevitt | 382/218 |
| 2012/0187185 A1* | 7/2012 | Sayan | 235/375 |
| 2012/0246594 A1* | 9/2012 | Han et al. | 715/790 |
| 2012/0254793 A1* | 10/2012 | Briand et al. | 715/800 |
| 2013/0065521 A1* | 3/2013 | Jang et al. | 455/41.1 |
| 2013/0091238 A1* | 4/2013 | Liu et al. | 709/217 |
| 2013/0203353 A1* | 8/2013 | Kim et al. | 455/41.2 |
| 2013/0242189 A1* | 9/2013 | Babu et al. | 348/468 |
| 2013/0290348 A1* | 10/2013 | Jung et al. | 707/748 |
| 2014/0113550 A1* | 4/2014 | Li | 455/41.1 |

OTHER PUBLICATIONS

Seewoonauth, K. et al., "Two NFC Interaction Techniques for Quickly Exchanging Pictures Between a Mobile Phone and a Computer," Found at URL < http://dl.acm.org/citation.cfm?id=1613858.1613909&coll=DL&dl=GUIDE&CFID=75193032&CFTOKEN=74335401 >, Proceedings of the 11th International Conference on Human-Computer Interaction with Mobile Devices and Services. Sep. 15-18, 2009.

\* cited by examiner

TRANSFERRING DATA ITEMS AMONGST COMPUTING DEVICES USING METADATA THAT IDENTIFIES A LOCATION OF A TRANSFERRED ITEM

BACKGROUND

Near-device pairing can utilize various types of connection mediums, such as communication mediums provided through Infrared, Bluetooth, or Near Field Communications (NFC). The various forms of near-device pairing can be used to share data items, such as records, images, documents, music files or other types of data items.

DETAILED DESCRIPTION

Figure 1:
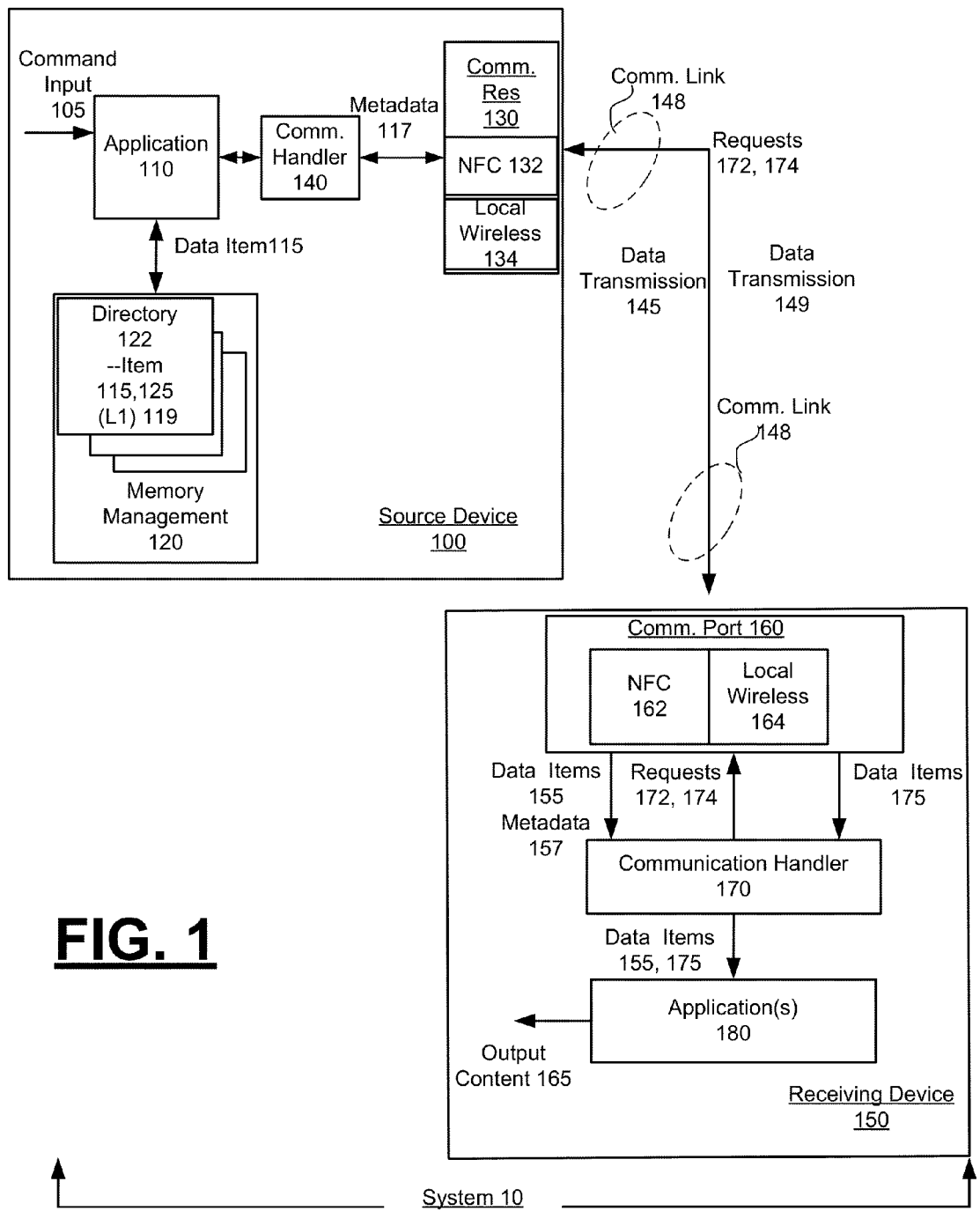
FIG. 1 illustrates an example system for transferring data items amongst computing devices, according to one or more embodiments.

Embodiments described herein provide for transferring data items amongst computing devices using metadata that identifies a location of a transferred item.

Under examples described herein, computing devices can be connected using near-device pairing, such as through NFC, for purpose of transferring data items. Embodiments recognize that the proximity of the two devices when connected (e.g., tapped together or brought to within 10 cm) provides a layer of security that can be leveraged to automate, or otherwise facilitate, the transfer of multiple data items between two computing devices.

Still further, embodiments enable a receiving device to display or otherwise output content based on multiple data items that are received from a source device. Examples are described herein in which the receiving device is able to display the multiple data items without need for the user to individually select and transmit each of the multiple data items from the source device. For example, a user can select an initial data item for transfer from a source device. The receiving device and source device can then exchange communications and data so that other data items are transferred from the source device with minimal or no additional user input.

Some embodiments described herein enable data items to be transferred from a source device to a receiving device using a sequenced set of data transmissions, in which a first data item is initially transmitted with metadata that identifies a location where that data item resides on the source device. The receiving device generates a follow-on request for data items. The data items that are identified for the request reside on the source device at the location specified by the metadata that is associated with the first data item. The source device transmits the data items to the receiving device, and the receiving device generates an output that is based on the data items received from the source device.

Among other benefits, embodiments such as described enable the receiving device to not just display a single data item from the source device, but to enable display and interaction with multiple data items that may originally reside with the source device. Thus, for example, rather than have a source and receiving device display a common data item (e.g., same picture), the source device can display one data item, and the receiving device can display multiple data items stored on the source device. Still further, some embodiments enable the user to interact with the receiving device in order to select data items that originally reside with the source device.

According to some embodiments, a source computer responds to a user command to transfer a data item to a receiving device. Metadata is associated with the data item to identify a location of the data item that is to be transferred. The data item is transmitted from the source device to the receiving device using an NFC link, with the associated metadata, from the source device to the receiving device. Subsequent to transmitting the data item, the source device responds to a request from the receiving device by transmitting one or more additional data items that are provided at the location of the transferred data item.

Still further, some embodiments receive a data item, and metadata associated with the data item, from a source device using a near field communication (NFC) link. The metadata identifies a location on the source device where the data item is provided. A request is transmitted to the source device that specifies the location identified by the metadata. One or more additional data items are received from the source device. The receiving device then outputs content that is based on the received data item and one or more additional data items.

Still further, some embodiments provide for a source device and a receiving device that operate to transfer data items from the source device to the receiving device, and to output content that is based on the received data items.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates an example system for transferring data items amongst computing devices, according to one or more embodiments. A system such as described by FIG. 1 can be implemented amongst two computing devices that are brought in proximity (e.g., 10 cm) or contact with one another so as to trigger a near-device pairing. In some embodiments, the near-device pairing can be provided with a near field communication (NFC) link. More specifically, a system 10 can be implemented between a first computing device that is the source of data items ("source device 100") and a second computing device that receives the data items ("receiving device 150"). Each of the source and receiving devices 100, 150 can be anyone of a possible number of computing devices, such as, for example, a mobile computing device (e.g., cellular telephony device), tablet, laptop, media player, camera, television, printer, audio/media system, projector or other computing device. In variations, one device (e.g., the receiving device 150) can correspond to a vendor machine, such as a kiosk or vending machine. In various examples described, the role of the computing devices in being source or receiving can be reversed for other data item transfers.

With reference to FIG. 1, source device 100 operates one or more applications 110, and maintains a memory management system 120 to organize or otherwise structure its stored data items (e.g., files, folders, directories). In the example provided by FIG. 1, memory management 120 includes one or more directories 122, each of which provide access to data items that can be opened and/or outputted on the source device 100 and/or transferred to the receiving device 150. Examples of such data items include images, video clips, audio clips (e.g., voice message or song), records, or documents (e.g., word processing, web pages). As an example, source device 100 may maintain a collection of images, organized by photo album directories, in memory. The source device 100 can also include one or more communication resources 130, including for example, an NFC interface 132, and local wireless interface (e.g., Bluetooth, Infrared (IR), Wireless Fidelity or WiFi (802.11a, 802.11b, 802.11g, 802.11n) etc.) 134.

Similarly, receiving device 150 includes the communication resources 160, including an NFC interface 162 and local wireless communication interface 164 (e.g., Bluetooth, Infrared (IR), Wireless Fidelity or WiFi (802.11a, 802.11b, 802.11g, 802.11n) etc.). For purpose of illustrating an embodiment, the receiving device 150 includes one or more applications 180 that generate output content 165 based on data items 155 that are received from the source device 100 via communication resources 160 (e.g., over NFC link 148). As described in greater detail, the receiving device 150 can also include functionality for generating a subsequent request 172 for additional data items 125, after receiving data an initial transmission for a first data item.

In operation, the application 110 operates to receive command input 105 from a user, and to transfer a user-selected, first data item 115 (as specified by the command input 105) maintained in the device memory to the receiving device 150. Accordingly, the command input 105 may select the first data item 115 to transfer. The command input 105 may contemporaneously also initiate the establishment of the communication link for transferring the data item. In particular, the command input 105 can be generated as part of an NFC environment. For example, the source and receiving devices 100, 150 can include NFC capabilities, which include software layers and functionality which are integrated into the operating system of each of the respective devices (e.g., user-interface, middleware etc.). Thus, an NFC link 148 can be established by, for example, bringing the respective NFC interfaces 132, 162 of the source and receiving devices 100, 150 in sufficient proximity to enable the NFC link 148 to be established. The establishment of the NFC link 148 can be done prior to or after the command input 105 specifying the NFC transfer is received. In some variations, the establishment of the NFC link 148 can be in response to the command input 105. Still further, the establishment of the NFC link 148 and the command input 105 to select and transfer one of the data items 115 can be performed at one time. For example, a user can open a picture on the source device 100, then tap the source device with the receiving device 150 in order to provide the command to transfer the opened image to the receiving device.

Accordingly, the command input 105 can include or correspond to a selection of a specified first data item 115. For example, the user can operate application 110 (e.g., photo-viewing application, document viewer) to scan one of the directories 122 and select the specified data item 115. Alternatively, the user can create or store the specified first data item 115, and then select to share the data item via the NFC link 148.

Accordingly, in response to receiving the command input 105, an embodiment provides that application 110 operates to establish a communication link with the receiving device 150. As described with various embodiments, the communication link can be NFC link 148. A communication handler 140 represents functionality that, on source device 100, interfaces the application with communication interfaces, such as NFC interface 132. The communication handler 140 can be provided as, for example, separate functionality (e.g., as separate application), as part of the device operating system, and/or as part of the one or more of the applications 110 that use the communication interfaces. According to some embodiments, the communication handler 140 includes functionality for generating a set of metadata 117 for use in transferring the first data item 115. In an embodiment, communication handler 140 is provided on the source device 100 as a separate component from the application 110. In variations, the application 110 can include functionality represented by the communication handler 140. The communication handler 140 can generate metadata 117 that identifies a location 119 of the selected data item 115 on the source device 100. The location 119 can be provided by, for example, a link, and can map to, for example, one of the directories 122 maintained by the memory management 120. As an example, the metadata 117 can correspond to an NFC tag that identifies one or more attributes of the selected first data item 115, including the file location of the data item 115. Other attributes, such as the date the first data item 115 was created or modified, permissions or restrictions of the first data item 115, etc. can also be included with the set of metadata 117 (e.g., NFC tag).

The source device 100 generates a first data transmission 145, corresponding to the first data item 115 and its associated metadata 117, to the receiving device 150 using the NFC link 148. The NFC interface 162 of the receiving device 150 operates to receive the first data transmission 145 that is assimilated into data item 155 and associated metadata 157. The assimilated data item 155 and metadata 157 can correspond to the data item 115 and associated metadata 117 selected for transmission on the source device 100. The data item 155 can be a rendition or duplicate of the data item 115. Likewise, the metadata 157 can correspond to or be based on the metadata 117 generated on the source device 100. The first data transmission 145 can communicate the data item 155 and metadata at one time, (e.g., in one session), or separately (e.g., in successive transmissions).

The communication handler 170 of the receiving device 150 includes functionality that handles the incoming data item 155 and metadata 157. In an embodiment, the communication handler 170 associates the incoming data item 155 to an application. For example, the communication handler 170 can associate the data item 155 to an application based on data type and/or the application that is running on the receiving device.

In embodiments, the communication handler 170 includes logic to programmatically generate one or more requests 172 for additional data items 125. The requests 172 can be communicated to the source device 100 using the communication resources 160 (e.g., the NFC interface 162). The communication handler 140 of the source device 100 can process and respond to the request 172. In one implementation, the request 172 is identifiable on the source device 100 as being a response to the first data transmission 145 which communicated the first data item 115. For example, the request 172 can be associated with the first data transmission 145 because the source and receiving devices 100, 150 are linked via NFC. Because the source device 100 can identify the request 172 to the first data item 115, the source device can also identify the location 119 of the first data item 115 for purpose of identifying other data items at that location for possible communication to the receiving device 150. In variations, the request 172 can include data that identifies the first data item 115 and/or the first data item's location (based on location data that can be optionally included in the first data transmission 145).

In an embodiment, the request 172 can also specify additional selection criterion, such as data type, or other attributes. For example, the request 172 can specify additional criteria that includes the file type of the first data item 115. In variations, the additional criteria can be generated or imposed on the source device 100, independently of the request 172, based on the source device's knowledge of the first data item 115.

The communication handler 140 of the source device 100 can include functionality to generate the response (e.g., subsequent data transmissions 149) to the request 172. In one embodiment, the communication handler 140 can scan the location 119 of the first data item 115 for one or more additional data items 125 that satisfy criteria for responding to the request 172. The criteria can specify data items by location (e.g., being in the same directory or folder as the first data item 115), as well as optionally by type or other attribute.

The communication handler 140 can identify a set of one or more additional data items 125 as a response to the request 172. A subsequent data transmission 149 corresponding to the set of data items 125 can be communicated to the receiving device 150. In one implementation, the data transmission 149 is communicated via the NFC link 148, or via a subsequently established NFC link. In variations, the data transmission 149 is communicated via an the alternative local wireless interface 134 to the corresponding interface 164 of the receiving device 150. For example, the source device 100 can establish a Bluetooth link with the receiving device 150 for purpose of communicating the subsequent data transmission 149.

The receiving device processes the subsequent data transmission 149 in order to identify additional data items 175 that correspond to the set of additional data items 125 residing on the source device 100. For example, the subsequent data transmission 149 can result in the communication handler 170 of the receiving device 150 establishing data items that are reductions (e.g., thumbnails), renditions or duplications of the set of additional data items 125.

Figure 3:
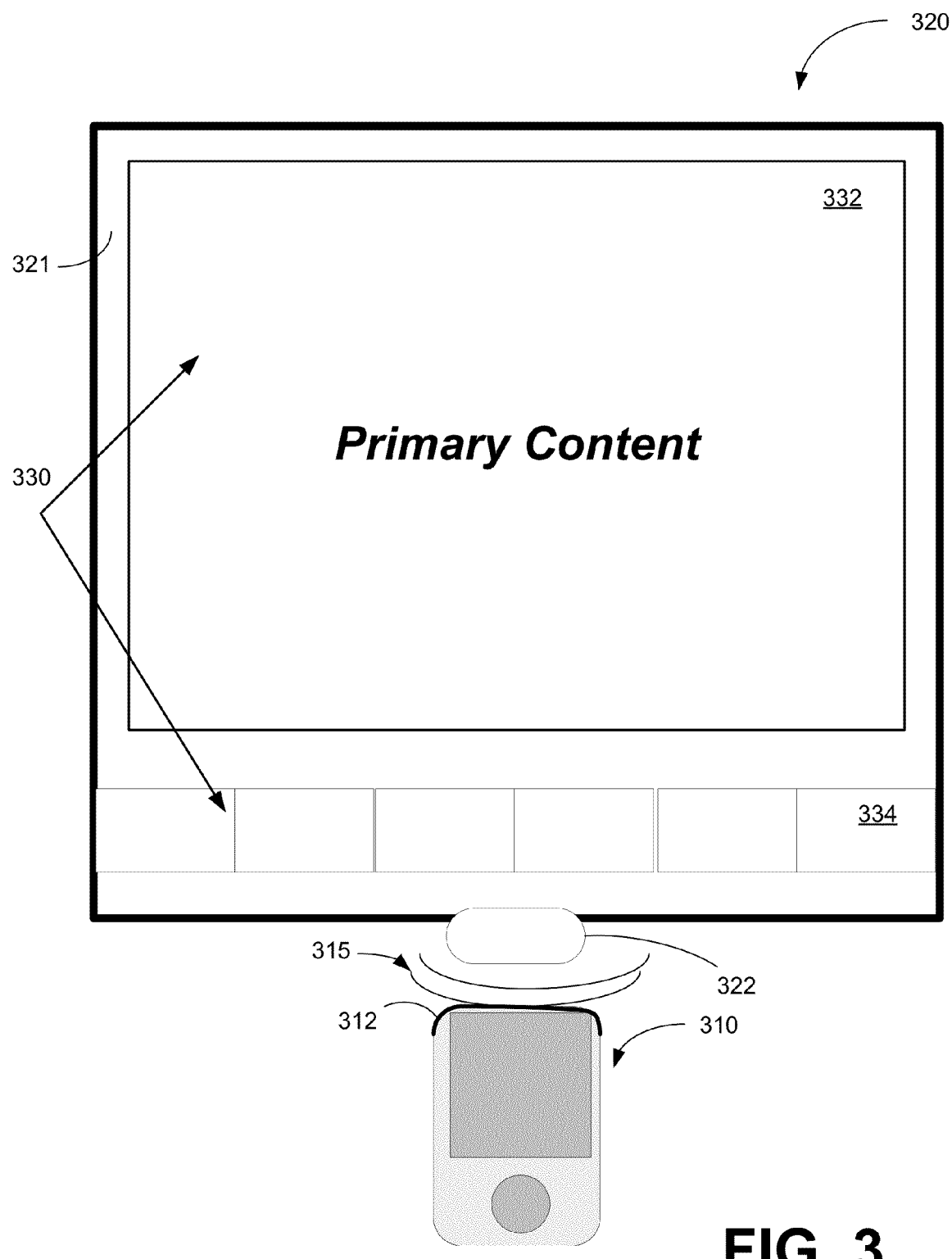
FIG. 3 illustrates an example of two computing devices that transfer data items in accordance with one or more embodiments.

The first established data item 155 and the additional data items 175 are communicated to the application 180 for output. In some implementations, the application 180 coincides with the same application that executes on the source device 100 when the first data item 155 is transmitted. In variations, however, the source and receiving device may operate different applications. In an embodiment, the application 180 can generate an output content 165 that renders the data items 155 and the additional data items 175. Various formats, styles or processes can be used to render the data items 155, 175. For example, FIG. 3 illustrates an example in which the first data item is rendered as a primary image that occupies a majority of the display surface, which the data items in the subsequently obtained set are displayed as reductions that occupy, for example, a bar provided over a region of the display surface. In variations, the data items can require audio output (e.g., songs), rather than (or in addition to) visual output.

Still further, in some implementations, the individual data items can be displayed with features to enable the individual images to be selectable. For example, the user may be able to interact with the receiving device 150 to select one of the additional data items 175, which can be reductions, for full viewing or transfer. The interaction can cause a follow on request 174 to the source device for another data transmission that provides a copy of the selected data item.

As an addition or alternative, one or more follow-on requests 174 can be generated on the receiving device 150, in response to user-input or other events that are provided with the receiving device. For example, as described with other examples, the follow-on requests 174 can specify operations that are to be performed on select data items that were transferred in the first data transfer 145 (e.g., first data item 115) or second data transfer 149 (e.g., additional data items 125). In variations, the operations can be performed on either the receiving device 150, the source device 100, or both of the receiving and source devices. The follow-on requests 174 can include requests for the source device 100 to perform such operations (e.g., print from the source device), or to have the source device 100 transmit copies (e.g., larger data size versions) to the receiving device 150. The receiving device 150 can, for example, request a full copy to enable an operation (e.g., print) to be performed from the receiving device 150. Thus, for example, the receiving device can display the additional data items 175 to facilitate user selection and manipulation of a collection of data items that are originally provided on the source device 100.

As an alternative example, the source and receiving devices 100, 150 may establish a link using a local radio-frequency or IR interface 134, 164, respectively. To detect a near-device pairing environment (e.g., devices are brought to within 10 cm of each other), sensors such as for detecting proximity, depth or location can be used. For example, the source and receiving devices 100, 150 can utilize a proximity sensor, depth sensor, camera or other component to detect when a designated near-device pairing condition is met. Once the condition is met, the devices can operate as described with other examples such as recited with, for example, FIG. 1.

Methodology

Figure 2:
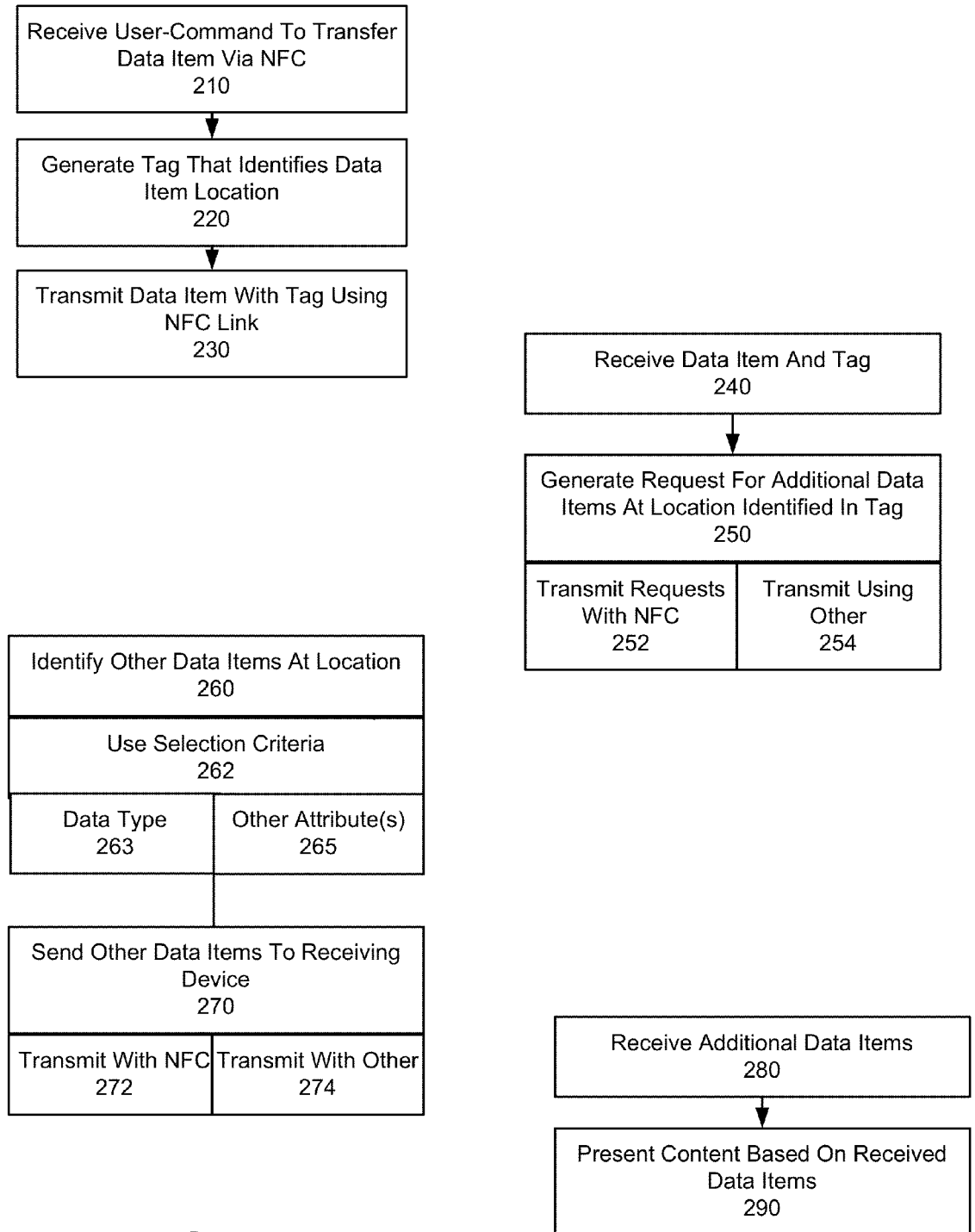
FIG. 2 illustrates an example method for transferring data items amongst computing devices using an NFC link, according to one or more embodiments.

FIG. 2 illustrates an example method for transferring data items amongst computing devices using an NFC link, according to one or more embodiments. A method such as described with an embodiment of FIG. 2 may be implemented using a system such as described with an example of FIG. 1. Accordingly, reference may be made to elements of FIG. 1 for purpose of illustrating a suitable element for performing a step or sub-step being described.

On source device 100, a command input 105 is received to transfer the data item 115 to the receiving device (210). The command input 105 can be entered by a user. For example, a user can operate application 110 (e.g., document viewer, photo-viewer) to select the data item 115. The application 110 can include or provide memory management resource 120 to enable the user to, for example, browse or search and select the data item 115. In some implementations, the selection of the data item 115 can be made in connection with the establishment of the NFC link 148. For example, in one implementation, the user can select the data item 115 and then perform the action for establishing the NFC link 148 with the receiving device (e.g., the user can tap the two devices together to establish the NFC link 148). Alternatively, the NFC link 148 can be established at the time of selection of data item 115.

In response to the user selecting the data item 115 and establishing the NCF link 148, an embodiment provides that the source device generates metadata 117, in the form of an NFC tag (220). The NFC tag can identify the location 119 of the selected data item 115. The location 119 can be specified relative to the structure defined by the memory management resource 120 of the source device 100. For example, the tag can identify a folder or directory of the source device 100.

The NFC tag can be associated with the data item 115 and transmitted to the receiving device 150 (230). The generation and transmission of the NFC tag can be performed automatically, in response to, for example, the user selecting the data item 115 for transmission. Alternatively, the NFC tag can be retained on the source device 100 for responding to follow-on requests 172, 174 from the receiving device 150.

On the receiving device, the transmission for the data item and associated NFC tag is received (240). The receiving device 150 includes resources (e.g., communication handler 170) to generate the request 172 based on information contained in the NFC tag.

The receiving device 150 generates the request 172 for additional data items (250). For example, the communication handler 170 can be triggered by the NFC tag associated with the firs data item to generate the request 172. The request can be made for using the established NFC link 148, or alternatively, the receiving device can establish a new NFC link to communicate the request 172 (252). Alternatively, the requests 172 can be transmitted using an alternative communication medium, such as a local wireless communication port (e.g., Bluetooth) (254).

The request 172 can be made specific for the location of the data item 115 (e.g., folder or directory of the data item 115). For example, the receiving device 150 can inpsect the NFC tag to identify the location information for the first data item 115, then specify the location information in the request 172. In variations, the request 172 can be processed on the source device 100 to be specific to the location of the first data item 115. For example, the source device 100 may be programmed to associate the request 172 from the receiving device with the prior transmission from the source device. When the follow-on request from the receiving device is received, the source device 100 automatically scans the location of the first data item 115.

The source device 100 responds to the request 172 by identifying a set of additional items 125 that are at the location 119 of the request 172 (260). In some embodiments, the source device 100 applies one or more additional criteria in identifying the set of additional data items 175 for transmission (262). The examples of additional criteria can include determining a same data type of class (263). For example, if the original data item is an image file (e.g., JPEG), then the set of additional data items may be selected in part based on the criteria of their data types being the same (e.g., JPEG) or of a same class (e.g., GIF). The additional criteria can also specify other attributes, such as creation date, author, modification date, permissions etc. (265).

In response to receiving request 172, source device 100 sends the identified one or more additional data items 175 to the receiving device 150 (270). The additional data item(s) are selected from the location identified from the request 172. The additional data items 175 can be transmitted using the NFC link 148 (272). As a variation, the additional data items 175 can be sent to the receiving device 150 using an alternative local wireless link, such as a Bluetooth interface (274).

On the receiving device 150, the additional data items 175 are received (280). For example, the communication handler 170 can receive the data items 175. The application 180 can use the first data item 155 and the additional data items 175 to output content that utilizes the individual data item (290). An example of the output is illustrated with an example of FIG. 3.

USAGE EXAMPLES

FIG. 3 illustrates an example of two computing devices that transfer data items in accordance with one or more embodiments. In the example of FIG. 3, a source device corresponds to a mobile computing device 310, such a cellular telephony/messaging device or tablet, and the receiving device corresponds to a large form factor device 320, such as a personal computer or television. The large form factor device 320 can provide a large display surface 321 for a user to view images that originally resides on the mobile computing device 310.

Each of the mobile computing device 310 and large form factor device 320 include a corresponding NFC interface 312, 322. In the example shown, an NFC link 315 can be established between the two devices using their respective NFC interfaces 312, 322.

In the example shown, the mobile computing device 310 displays an image or other content prior to the NFC link 315 being established. Once the NFC link 315 is established, the two devices display the same content. In addition, the large form factor device 320 is able to use location information provided with the transmitted NFC tag in order to identify additional content items, which it can display in various forms (e.g., in the form of a channel bar).

More specifically, with reference to the example provided, the source device (e.g., mobile computing device 310) transmits a first data item to the receiving device (e.g., large form factor device 320). In response to receiving the first data item, the large form factor device 320 request additional data items that have a common location with the first data item. The mobile computing device 310 then transmits the additional data items to the large form factor device 320.

In the example shown by FIG. 3, the data items may correspond to images or documents. The large form factor device 320 creates a presentation 330 that includes the data items the device receives from the source device 310. In the example shown, the presentation 330 displays the first data item as primary content 332, and the additional data items as supplemental content 334. The additional data items can be presented, for example, in linear form across a segment of the primary content 332. In an implementation such as shown, the additional data items can be transmitted from the mobile computing device 310 in reduced form, so as to have a smaller data size than the original version of the data items on the source device. Each of the images shown in the supplemental content 334 can be selectable, so that, for example, user input results in the large form factor device 320 making another selection from the mobile computing device 310 for a full or larger version of that particular data item.

With reference to the example of FIG. 3, the mobile computing device 310 can be used to store, for example, a collection of images or other data items. When the NFC link 315 is established with the large form factor device, both devices can display the same image at the same time. In addition, embodiments described herein provide that the receiving device 320 can display multiple additional images, which may not necessarily be on display on the mobile computing device 310. As shown with the example of FIG. 3, the additional images may be displayed in, for example, a linear and reduced form. Furthermore, the presentation can be interactive, to enable the user to select both the primary and the reduced images for additional operations. With user selection of, for example, one of the reduced images, the large form factor device 320 can make an additional request for that data item, and render the additional data item as the primary content 332. In this way, the user can, for example, interact with the large form factor device (or receiving device) in order to select or otherwise perform operations on data items that reside on the mobile computing device (or source device).

According to some embodiments, the sequence of data transmissions that result in the transfer of data items can be performed in a relatively short duration of time, coinciding with the establishment of the NFC link 315. For example, the sequence of data transmissions can occur during a duration in which the two devices are brought in proximity and tapped against one another.

ALTERNATIVE USAGE EXAMPLES

While an example of FIG. 3 illustrates an implementation in which images are transferred, variations to the example described can provide for other types of data items to be transferred. For example, in one implementation, the combination of data items can include images/documents and audio. For example, the first data item that is transmitted from the source device may correspond to an image, and one or more of the subsequent data items may correspond to audio files, such as a music file.

In another implementation, the source device may provide the receiving device with a first data item that corresponds to an audio file, such as a music file. The receiving device may request additional music files in response to receiving the additional transmission. In such an example, the additional music files may, for example, be associated on the source device with a common playlist of the first music file that is transmitted. Alternatively, the additional music files that are requested by the receiving device can comprise additional tracks of a compilation (e.g., album). Thus, the metadata that is transmitted with the first music file can identify a playlist or compilation. As another variation, the additional data items can include images, such as album art, which are displayed while the music files are played back.

As another example, the larger form factor device 320 can alternatively be a printer. In operation, the mobile computing device 310 can generate the NFC link 315 to transfer a first item for print. A process such as described with various examples herein can be implemented in order to display, on for example, a display screen of the printer, multiple items for print selection on a file folder of the display device. With further reference to the example of FIG. 1, the print device can receive the first data item (e.g., data item 115), then request (e.g., via request 172) additional data items (e.g., data items 125) from the same file folder (e.g., location 119) of the source device. Thus, the first data item can be, for example, printed on the printer (acting as the receiving device 150), and the printer can display thumbnail or reduced versions of the additional data items (e.g., data items 175) for user selection. The user can then interact with the printer in order to select the additional data items for print. In one implementation, when additional data items are selected for print by the user (interacting with the receiving device), the receiving device can request (e.g., follow-on requests 174) full copies of the selected items for purpose of performing additional print operation.

As another example, the receiving device can correspond to a kiosk or vending machine, and a user can link a device to the kiosk or vending machine in order to perform operations such as print, copy etc. As described with other embodiments, the kiosk or vending machine can automatically request additional data items for reduced or thumbnail presentation.

As with many examples described herein, the use of near-device pairing (e.g., through NFC link 315 of FIG. 3) provides inherent security feature, in that the operator of the source device is present at the receiving device. Thus, embodiments recognize that the receiving device can be implemented to automatically request additional data items based on an assumption that the link between the two devices is secure, and the user interaction with both devices is with the same user.

Hardware Diagram

Figure 4:
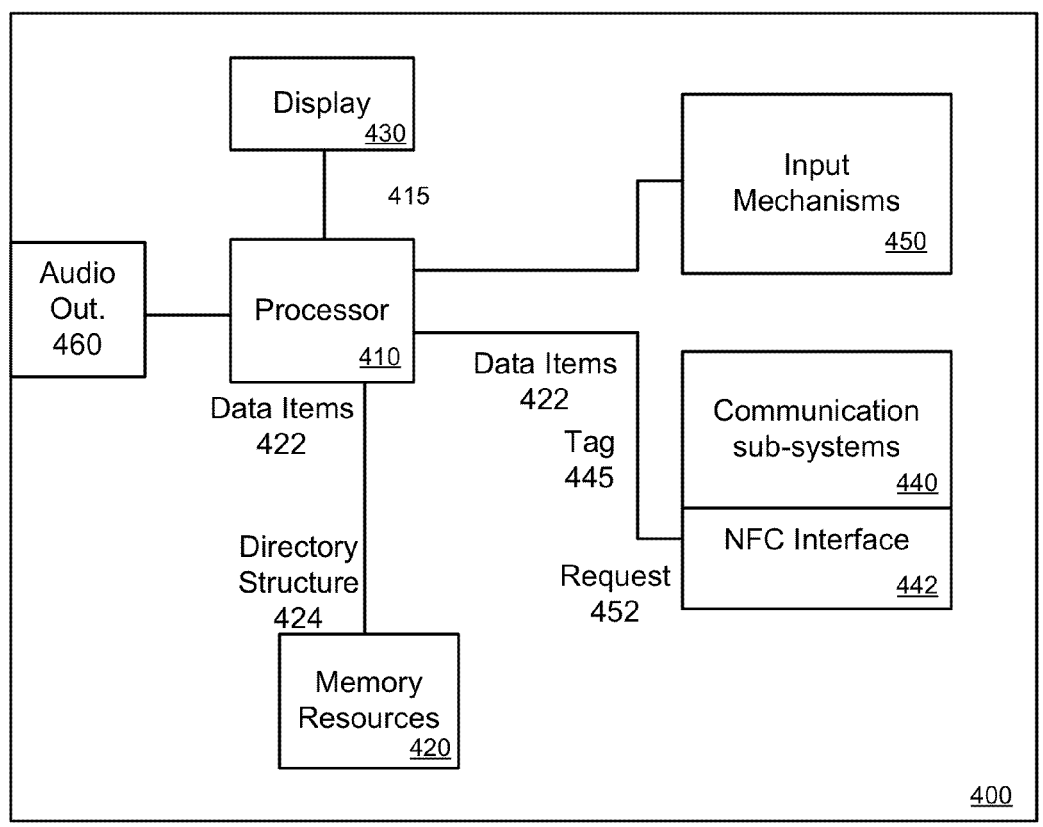
FIG. 4 illustrates an example hardware diagram for a computer system upon which embodiments described herein may be implemented.

FIG. 4 illustrates an example hardware diagram for a computer system upon which embodiments described herein may be implemented. For example, in the context of FIG. 1, the source and receiving devices 100, 150 that comprise system 10 can each be implemented using a computer system such as described by FIG. 4. According to embodiments, each computing device 400 can correspond to one of a mobile computing device (e.g., cellular device that is capable of telephony, messaging, and data services), tablet, laptop, netbook, media playback device, smart television, media playback device, projector, camera, or personal computer. The computing device 400 includes a processor 410, memory resources 420, a display device 430, one or more communication sub-systems 440, and an input mechanism 450. The communication sub-system 440 includes a NFC system 442. The memory resources can be structured or otherwise provided an organization layer corresponding to, for example, a directory structure 424.

The processor 410 is configured with software and/or other logic to perform one or more processes, steps and other functions described with embodiments, such as described by FIG. 1-3, and elsewhere in this document. Processor 410 can be configured, with instructions and data stored in the memory resources 420, to implement functionality such as described with the source device 100 or the receiving device 150. For example, instructions for generating the metadata (e.g., NFC tag), as described by some embodiments, can be stored in the memory resources 420. When implemented for source device 100, the processor 410 can execute instructions to (i) enable a user to select (e.g., via input mechanism 450) the data item 422, (ii) automatically associate a set of metadata or tag 445 with the data item 422 to identify its location (e.g., relative to the directory structure 424), (iii) control transmission of the data item 422 and the metadata 424 through the NFC interface 442, and (iv) identify and send additional data items 423 to the receiving device in response to receiving the request from the receiving device. When implemented on the receiving device 150, the processor 410 can execute instructions to (i) process the first or initial data item from the source device, (ii) automatically generate the request for 452 additional data items, and (iii) output content that is based on the received data items.

The processor 410 can provide content to the display 430 by executing instructions and/or applications that are stored in the memory resources 420. In some embodiments, the content can also be presented on another display of a connected device via a wire or wirelessly. Still further, an audio data item (e.g., music) can be outputted through an audio component 460.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computer-implemented method for transferring data items amongst computing devices, the method comprising:
    receiving, on a mobile computing device, a user selection of a data item associated with additional content stored on the mobile computing device;
    generating metadata for the data item, the metadata indicating a storage location of the additional content on the mobile computing device;
    initiating a near field communication (NFC) interface of the mobile computing device;
    detecting a NFC interface of a receiving device and transmitting the data item, including the generated metadata, to the receiving device using the NFC interfaces based on a tap event between the mobile computing device and the receiving device;
    after the tap event, receiving, over an established Bluetooth or Wi-Fi link with the receiving device, a request from the receiving device identifying the storage location based on the metadata of the transmitted data item received by the NFC interface of the receiving device;
    in response to receiving the request, identifying the additional content associated with the transmitted data item and stored at the storage location in the mobile computing device; and
    transmitting the additional content to the receiving device over the established Bluetooth or Wi-Fi link;
    wherein the metadata comprises a NFC tag to trigger the receiving device to generate the request.

2. The method of claim 1, wherein the transmitted data item corresponds to an image, and wherein the additional content corresponds to an audio file associated with the image.

3. The method of claim 1, wherein the receiving device is a printer, and wherein the transmitted data item represents a file folder comprising the additional content to be printed.

4. The method of claim 1, wherein identifying the additional content comprises scanning the storage location identified in the request.

5. A mobile computing device comprising:
    a touch-sensitive display;
    a near field communication (NFC) interface;
    a Bluetooth or Wi-Fi interface;
    one or more processors; and
    one or more memory resources storing instructions that, when executed by the one or more processors, cause the mobile computing device to:
        receive, on the touch-sensitive display, a user selection of a data item associated with additional content stored in the one or more memory resources;
        generate metadata for the data item, the metadata indicating a storage location of the additional content in the one or more memory resources;
        initiate the NFC interface of the mobile computing device;
        detect a NFC interface of a receiving device and transmit the data item, including the generated metadata, to the receiving device using the NFC interfaces based on a tap event between the mobile computing device and the receiving device;
        after the tap event, receive, by the Bluetooth or Wi-Fi interface, a request from the receiving device identifying the storage location based on the metadata of the transmitted data item received by the NFC interface of the receiving device;
        in response to receiving the request, identify the additional content associated with the transmitted data item and stored at the storage location in the mobile computing device; and
        transmit the additional content to the receiving device using the Bluetooth or Wi-Fi interface;
        wherein the metadata comprises a NFC tag to trigger the receiving device to generate the request.

6. The mobile computing device of claim 5, wherein the transmitted data item corresponds to an image, and wherein the additional content corresponds to an audio file associated with the image.

7. The mobile computing device of claim 5, wherein the receiving device is a printer, and wherein the transmitted data item represents a file folder comprising the additional content to be printed.

8. The mobile computing device of claim 5, wherein identifying the additional content comprises scanning the storage location identified in the request.

9. A non-transitory computer-readable medium storing instructions that, when executed by one or more processors of a mobile computing device, cause the mobile computing device to:
    receive, on the mobile computing device, a user selection of a data item associated with additional content stored on the mobile computing device;
    generate metadata for the data item, the metadata indicating a storage location of the additional content on the mobile computing device;
    initiate a near field communication (NFC) interface of the mobile computing device;
    detect a NFC interface of a receiving device and transmit the data item, including the generated metadata, to the receiving device using the NFC interfaces based on a tap event between the mobile computing device and the receiving device;
    after the tap event, receive, over an established Bluetooth or Wi-Fi link, a request from the receiving device identifying the storage location based on the metadata of the transmitted data item received over the NFC interface of the receiving device;

in response to receiving the request, identify the additional content associated with the transmitted data item and stored at the storage location in the mobile computing device; and transmit the additional content to the receiving device over the established Bluetooth or Wi-Fi link;

wherein the metadata comprises a NFC tag to trigger the receiving device to generate the request.

10. The non-transitory computer-readable medium of claim 9, wherein the data item corresponds to an image, and wherein the additional content corresponds to an audio file associated with the image.

11. The non-transitory computer-readable medium of claim 9, wherein the receiving device is a printer, and wherein the data item represents a file folder comprising the additional content to be printed.

12. The non-transitory computer-readable medium of claim 9, wherein the executed instructions cause the mobile computing device to identify the additional content by scanning the storage location identified in the request.

* * * * *